United States Patent [19]
Jestin et al.

[11] Patent Number: 5,377,162
[45] Date of Patent: Dec. 27, 1994

[54] UNDERWATER OBJECT PASSIVE TRACKING PROCESS AND DEVICE

[75] Inventors: Vincent Jestin, Toulon; Richard Becera, Hyeres; Etienne Charpentier, Paris; Alain Filipowicz, Toulon, all of France

[73] Assignee: L'Etat Francais (represented by the Déléqué Général for l'Armement), Armees, France

[21] Appl. No.: 130,888

[22] Filed: Oct. 4, 1993

[30] Foreign Application Priority Data

Oct. 8, 1992 [FR] France .................. 92 11944

[51] Int. Cl.$^5$ ............................... G01S 5/18
[52] U.S. Cl. ...................... 367/124; 367/127; 367/129
[58] Field of Search ........... 367/124, 125, 127, 129, 367/118; 364/516

[56] References Cited

U.S. PATENT DOCUMENTS 5,036,498  7/1991  Cappel .................. 367/125

FOREIGN PATENT DOCUMENTS 2504275  10/1982  France .
2614427  10/1988  France .

Primary Examiner—Daniel T. Pihulic
Attorney, Agent, or Firm—Oliff & Berridge

[57] ABSTRACT

A real time passive trajectography device comprises at least three pairs of sensors. Each pair of sensors is separated from the other pairs of sensors by a distance which is greater than the distance separating each of the sensors of the pair. One of the pairs of sensors is roughly aligned with the currently determined trajectory while other pairs of the sensors are aligned at 0° to 30° from the perpendicular to the current trajectory. Of each pair of sensors, the output signal from a first sensor is used as a reference signal. The output signal from a second sensor is compared to the output signal of the first signal based on a presumed speed of the object being tracked. The presumed speed is continually updated until a maximum correlation between the first and second output signals is obtained. The measurement and correlation operation is repeated at predetermined intervals, with the initial presumed speed extrapolated from the trajectory previously computed during previous intervals. Prior to the speed analysis, the output signals from the sensors are digitized. The output signals are then homogenized and made coherent by a white noise operation to free the information content of the signals from their power throughput. In order to achieve approximate real time operation, a computer for performing the signal analysis includes vectorial cards and has a parallel architecture.

24 Claims, 2 Drawing Sheets

UNDERWATER OBJECT PASSIVE TRACKING PROCESS AND DEVICE

BACKGROUND OF THE INVENTION

1. Field of the Invention

The objective of the present invention is an underwater objects passive tracking process and device.

The technical scope of the invention is the field of acoustic telemetry.

One of the principal applications of the invention is the possibility to know the trajectory followed by a marine mobile in real time, starting from the individual noises radiated by the latter, e.g. during self-propulsed equipment test phases in order to know the performances, particularly for torpedoes.

2. Related Art

Indeed, two families of trajectory tracking processes and devices are known:

the first family is the only one used today to establish fine trajectography, like in test centers or on crowded offshore sites; it groups active telemetry equipments comprising emitters located on the mobile, which produce acoustic waves in a given frequency or a frequency spectrum, according to given time intervals, thus allowing to easily identify them or to collect them by means of receivers uniformly and individually located, in a fixed way on the site. The received signals being processed, it is possible to deduce the position of the mobile at any time, and step by step, its trajectory.

The main disadvantage of these systems is the necessity of installing an emitter on the mobile, space requirement being a problem and then its performances are limited, with in addition the risks of failure or too low emission levels, perturbations of homing heads which may be possibly installed on the mobiles or on board the torpedoes, a complication of implementation procedures on sea, etc., without forgetting the problem of these emitters stock management.

The other family of this invention is essentially used today for the passive detection of the other mobiles which might threaten a site or sub-marine missile; any suspect surrounding noise must be then identified, or we must try to identify the source and to determine if the direction of displacement of the latter does not converge towards the concerned site or missile; this alarm function has only rough actions, even if improvements have been brought, applications for a patent having been filed for some of them; such as N° FR 2.504.275 filed on Apr. 15, 1981 and N° FR. 2.614.427 filed on Apr. 24, 1987 by THOMSON CSF company concerning "Passive sound telemetry processes and systems using three sensors receivers in a line"; the three received signals are processed by taking the central receiver as a reference to compute the delays of the two others and to correlate the whole.

Therefore, the processes and devices of that second family do not allow to know with accuracy the location of the localized missile to be positioned at any time in order to know the trajectory accurate characteristics, as it eliminate many factors, particularly the unsteadiness and anisotropy of the noises radiated by the latter; indeed, the combination of the noises produced by the shipped motor(s), the fluid flow around its shell, the cavitation of the propeller(s), the internal vibrations, etc., cannot be steady for long, nor homogeneous in all directions. This means that an observer motionless compared to the missile sees two different spectra at two different moments, and the same occurs for two observers placed in different points at the same moment.

Moreover, in active mode as well as in passive mode, in the two families of trajectory tracking processes and devices recalled here-above, the fact that the missile is in motion is always neglected; in that case, the signal received by an observer, originated from the mobile missile itself, or coming from a shipped emitter, is then modified by the Doppler's effect, to obtain correlated signals, they should be processed by being assigned a suitable Doppler's coefficient; but, by definition, the latter is unknown at the time of the initial detection.

Taking into account the inaccuracy of all the actions such as they are recalled here-above, and the heaviness and slowness of the correlation computing which then would not allow a tracking in real time with the known processes and devices, today this Doppler's effect is neglected, and thus it is impossible to know the searched trajectory with accuracy.

The stated problem is to define passive trajectography processes and devices for underwater polygons or sites, allowing to track a mobile travelling towards and among them, with a good accuracy, as regards geometric coordinates and the speed and acceleration, and taking into account the Doppler's effect provoked by its speed as well as the factors of anisotropy and unsteadiness of the noise radiated by the mobile itself.

SUMMARY OF THE INVENTION

A solution to the stated problem is an underwater objects passive trajectography process using immersed sensors, to transform the sound waves emitted by said object into electric signals, and a computing central unit receiving said signals and able to process them, in which:

at defined and known time intervals, the S1 and S2 signals coming from the two said sensors are collected; then they constitute a pair whose distance is known, the latter being selected lower than the distance separating them from the other hydrophones, and whose accurate direction of alignment is also known;

one of said signals S1 is chosen as a reference; it is received at a time t1 from one of said hydrophones and a S2 signal supposed to be representative of the same sound wave is collected, this sound wave being emitted at the same original moment t0 by said object, and received from the other hydrophone at a moment t2 estimated depending on an estimated delay linked to the presumed direction "d" of the object at a given moment of measurement compared to the alignment of the pair of hydrophones;

this second signal S2 is corrected according to the presumed speed of the object at instant t0, to take into account the Doppler's effect, and the hereabove presumed data are corrected until the maximum value of a function of intercorrelation between signals S1 and S2 is obtained;

then the operation of measurement and computing is started again after the next time interval with a defined and known duration, considering the correlated and corrected data of the previous time interval, which are modified by the increment estimated values, extrapolated according to the travelled trajectory of the object and computed by the previous time intervals.

In a preferred embodiment, at least three pairs of said sensors installed are in known positions and are used by comparing each pair to the others; the reached results are compilated with each pair according to the hereabove defined process, on the one hand for the "d" directions of emission which defined for each pair a cone directed their axis of alignment, and whose intersection indicates the point where the object is located, and on the other hand, for the speed components which are the values, projected onto the perpendiculars to each "d" direction of the object actual speed; then by recomposition, the direction of advance and the proper value are known.

To reduce the capacities of the computing unit and to accelerate the obtention of results in view of a trajectography tracked in real time, the signals transmitted by the hydrophones in the most significant range of wave frequencies emitted by said object are digitalized; and said signals are made homogeneous and coherent by a whitening operation allowing to be free from the power of said signals to keep only the information content.

The result is new underwater object trajectography processes and devices using methods of detection of measurements and processing of radiated noise, called passive and responding to the here-above stated system.

As regards the previously mentioned noise unsteadiness, should we imagine a steady missile whose own noise is thus unsteady, but isotropic in a medium of perfect propagation, at a given instant, the signal emitted by the missile will have a certain spectrum and at another different instant, it will have also a different spectrum.

It can be imagined that an observer, located in a known point and able to recognize at each moment the spectrum of the received signals can note the date of each received signal.

Then the problem is the same as the one in active trajectography, except the fact that, then, to know the location of the acoustic device, four unknowns instead of three have to be determined: the time of the instant of emission and the three coordinates of the mobile location at that moment; in theory, four observers, or four hydrophones, or sensors, are sufficient to completely solve the problem.

In practice, the selected spectrum of reference is the one received by a hydrophone at a given instant; then by performing the intercorrelation between the received signal and the signal of reference for each other hydrophone, the delay of propagation which corresponds to the maximum of intercorrelation is determined. With four delays, the system can be solved.

In the case of a missile in movement, the problem is entirely different, as the signal received by the observers is then modified by the Doppler's effect, and two observers located in two different places receive two different signals, even if they are emitted by the same sound wave; to obtain the correlated signals, they must be processed by assigning them their suitable Doppler coefficient, therefore, this coefficient is unknown in practice, nevertheless it can be evaluated from the previous locations of the mobile, and all the better since the sampling pitch is low compared to the missile dynamics.

As regards the computing, these intercorrelations are very heavy; then to reduce the computing time, the delay of propagation and the Doppler by interpolation of the previous locations must be evaluated and the maximum must be searched around this forecast.

During tests performed according to the process according to the invention, this processing of Doppler's effect as it is defined in the following pages, gave good results, as the underwater mobile speed is always low compared to the sound speed in water.

Moreover, the problem of the anisotropy of the noise emitted by the underwater missile has two main origins: on the one hand, due to the missile geometry, it is clear that the same noise will not be heard in any point of observation, e.g., the propellers will be better heard backward than forward, and on the other hand, the marine environment within which the missile moves about is also anisotropic, and the sound propagation is different depending on the followed trajectories.

Consequently, in two different points, different noises will be heard. Therefore, if two points are close enough, for the sensors of a pair such as the one defined in the present invention, they will receive nearly the same noise. In mathematic terms, it results in the fact that for two points sufficiently close the one to the other, the noises are correlated and peaks of intercorrelation can be obtained and thus the wanted delays of propagation despite the anisotropy of the radiated noise.

This solution allows also to reduce the computing times, as the range of estimation of the delays and Doppler is much more lower for adjacent hydrophones. Experience showed that in three or four iterations it was possible to converge towards the solution. Moreover, it allows also to initialize the process by an iterative method which rapidly gives reliable results.

The tests performed according to the devices and processes according to the invention allowed to check the feasibility of the latter and, on the one hand, in the field of computing rapidity, to tend towards real time, and on the other hand, to consider tracking multitarget trajectographies; with a computer equipped with vectorial cards and a parallel architecture, it is believed that approximately 2 second computing will be necessary, this effectively tending towards a trajectography in real time.

It must be noticed that the processes and devices according to the invention, whose application is essentially in passive trajectography, may also be used in active trajectography.

Other advantages of the present invention could also be mentioned but the ones mentioned here-above are sufficient to demonstrate its newness and interest. The description and the hereafter figures represent an example of embodiment of the invention, but their character is not limitative: other embodiments are possible within the framework of the impact and extent of the present invention, particularly with the use of intercorrelation, ambiguous and whitening functions adapted to the invention as defined, and which are only partially developed here as an example.

DETAILED DESCRIPTION OF THE PREFERRED EMBODIMENTS

Figure 1:
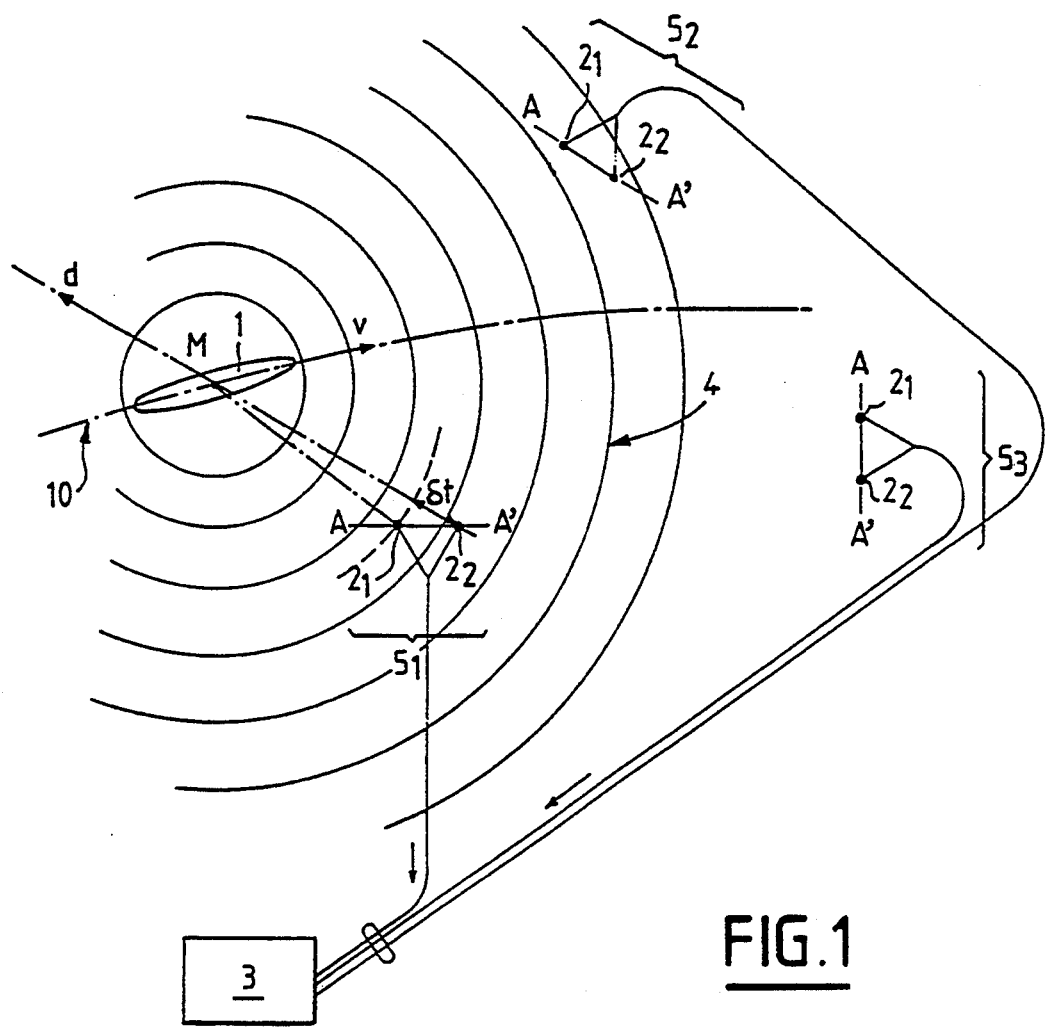
FIG. 1 is a simplified block diagram view of a device according to the invention.

FIG. 1 represents a device of passive trajectography of underwater object 1, installed, for example, on a test site, and using immersed sensors 2 put down on the bottom of water, on fixed structures for instance, and able to transform the sound waves 4 emitted by said object into electric signals; a central computing unit 3 receives said signals and is selected to process them according to the processes of the invention.

Said device according to the invention comprises at least six sensors 2 placed in pairs 5, whose distance between sensors $2_1$ and $2_2$ constituting each pair and whose direction of alignment AA', as well as the relative position of said pairs 5 compared to the other pairs are known with accuracy, said sensors having a wide pass-band to listen to sound waves.

In a preferred embodiment, to solve the problem of the previously defined anisotropy, the distance between the sensors 2 of each pair 5 is approximately one hundred meters, and moreover, the distance between said pairs 5 is approximately the water depth on the site, e.g. 500 meters.

To simplify the computing operations and to accelerate their speed, said pairs 5 are identical, and preferably, the axis of alignment AA' are directed:
  for one pair in the presumed direction of trajectory 10 of said object 1, thus allowing a better computing of delay on that pair of hydrophones, and consequently a better evaluation of the Doppler's effect and mobile speed;
  for the other pairs according to 30°–60° angles compared to the first one to obtain a better cross-check of the direction "d" of the cones of and thus to have a better accuracy of the location.

Figure 2:
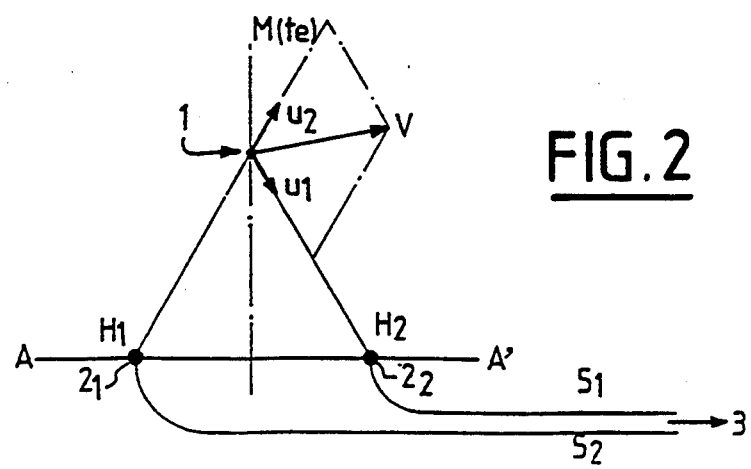
FIG. 2 is a geometric diagram of the known data and unknown parameters allowing to compute the process according to the invention.

FIG. 2 is a geometric diagram of the known data for a pair 5 comprising two sensors H1 and H2 as well as unknown parameters of mobile 1 allowing to clarify examples of computing process according to the invention.

If H1 and H2 are the three coordinates of hydrophones $2_1$ and $2_2$, "c" the sound average propagation speed in water, and M(te) the evaluated and presumed location of the mobile, considered at the moment of the evaluated emission t0 or te, the time of reception, also evaluated by hydrophone $2_1$ for instance, of the signal supposed to be emitted at that moment te by the mobile, evaluated to be positioned in M, is $$tr1 = te + \frac{MH1}{C}$$

The objective of the process according no the invention is to look for the accurate location M of the corresponding mobile at any instant t and related to the here-above equation.

The delay of reception of signal S2 of hydrophone $2_2$ as transmitted to the central unit 3 is thus equal to: $\delta t = tr1 - tr2$.

Hydrophone 1 Doppler coefficient is equal to:

$$D1(t) = \frac{\vec{V}(t) \cdot \vec{U1}(t)}{C} \text{ where } \vec{U1}(t) = \frac{\vec{MH1}(t)}{MH1(t)}$$

The same applies to hydrophone 2 Doppler coefficient modified by the corresponding index.

The Doppler differential of pair 5 of hydrophones $2_1$ and $2_2$ is thus equal to:

$$DD_{1,2}(t) = \frac{1 - D1}{1 - D2} - 1 = \frac{D2 - D1}{1 - D2} = \frac{1}{1 - D2} \frac{\delta t}{dt}$$

Should mobile 1 placed in M be fixed, signal S1(t) would be equal to:

$$S_1(t) = S\left(t - \frac{MH1}{C}\right)$$

as its speed is V, the Doppler's effect transforms signal S(t) into signal S1(t) by a function such as:

$$g1(t) = \frac{1}{1 - D1}(t - tr1) + te$$

where te is the emission time itself, and for t close tr1, thus:

$$S1(t) = S\left(\frac{1}{1 - D1}(t - tr1) + te\right)$$

That is to say, for signal S'1(t) detected by hydrophone 1 and translated of the time of reception evaluated compared to the original signal S1:

$$S'1(t) = S1(t + tr1) = S\left(\frac{1}{1 - D1}\right)(t + te)$$

for t close to 0.

Then to compare S'2(t) of hydrophone $2_2$, and S'1(t) of hydrophone $2_1$, instead of the here-above signal S'1(t) the following signal must be built:

$$S''1(t)S'1(h_{1,2}(t))$$

where $$h_{1,2}(t) = g_2[g_1^{-1}(t)]$$

thus $$h_{1,2}(t) = \frac{1 - D1}{1 - D2} \cdot t = (1 + DD_{1,2})t$$

It can be seen that the correction to be made does not coincide with the commonly widespread notion of differential Doppler which is simply the differences of the Doppler coefficients.

Signal S'1(t) being under digital form S'1(k, t) where $\Delta t$ is the sampling period, depending on the known and given time intervals, as previously defined, it is necessary to compute the values of:

$$S''1(t) = S''1(k \cdot \Delta t) = S'1(h_{1,2}(k \cdot \Delta t)) \text{ by interpolation}$$

At the level of this interpolation various tests have been performed and it appeared that an interpolation at the second order eventually linear was sufficient enough, and that a finer interpolation did not bring a noticeable improvement. The positions of the values to be interpolated being inaccurate due to the linear approximation at the level of MH(t) development, useless to compute the values whose position is false with much accuracy.

To determine the detection delay between the receivers, sensors or hydrophones, H1 and H2, or $2_1$ and $2_2$, S"1(t) and S'2(t) signals are compared by making the interpolation for t close to 0, the abscissa of the maximum then corresponding to the searched delay.

It would be possible to directly compute the interpolation function by computing the integral defined by the coefficient of intercorrelation between S"1 S'2:

$$C_{S''1S'2(\tau)} = \frac{1}{T} \int_0^T S_1''(t) \, S_2'(t - \tau) dt$$

This direct method to evaluate the interpolation function requires much computing time when the integration times and the searching range of delay are significant.

For a rapid computing, the method consisting in taking Fourier transform reciprocal of interspectrum can be chosen to evaluate the interpolation function. The interspectrum can be evaluated by the periodogram method by the average of several independent estimators, each evaluation being obtained on several signal brackets, with e.g. a given duration 0, by using a rapid Fourier transform algorithm. The principal advantage of this method is that it is more rapid than the integral direct computing, and that it also allows to very simply obtain evaluations of power spectral densities for each signal.

Even if a disadvantage of that type of estimation is a considerable risk of error as we work at the segment extremities (−8, +8), the values being close to the unusable extremities. In our case this is not very awkward as we are not interested by the whole intercorrelation function, but by the abscissa of its maximum which is normally close to the origin due to the a priori estimation of the detecting delay between receivers H1 and H2 or $2_1$ and $2_2$.

Figure 3:
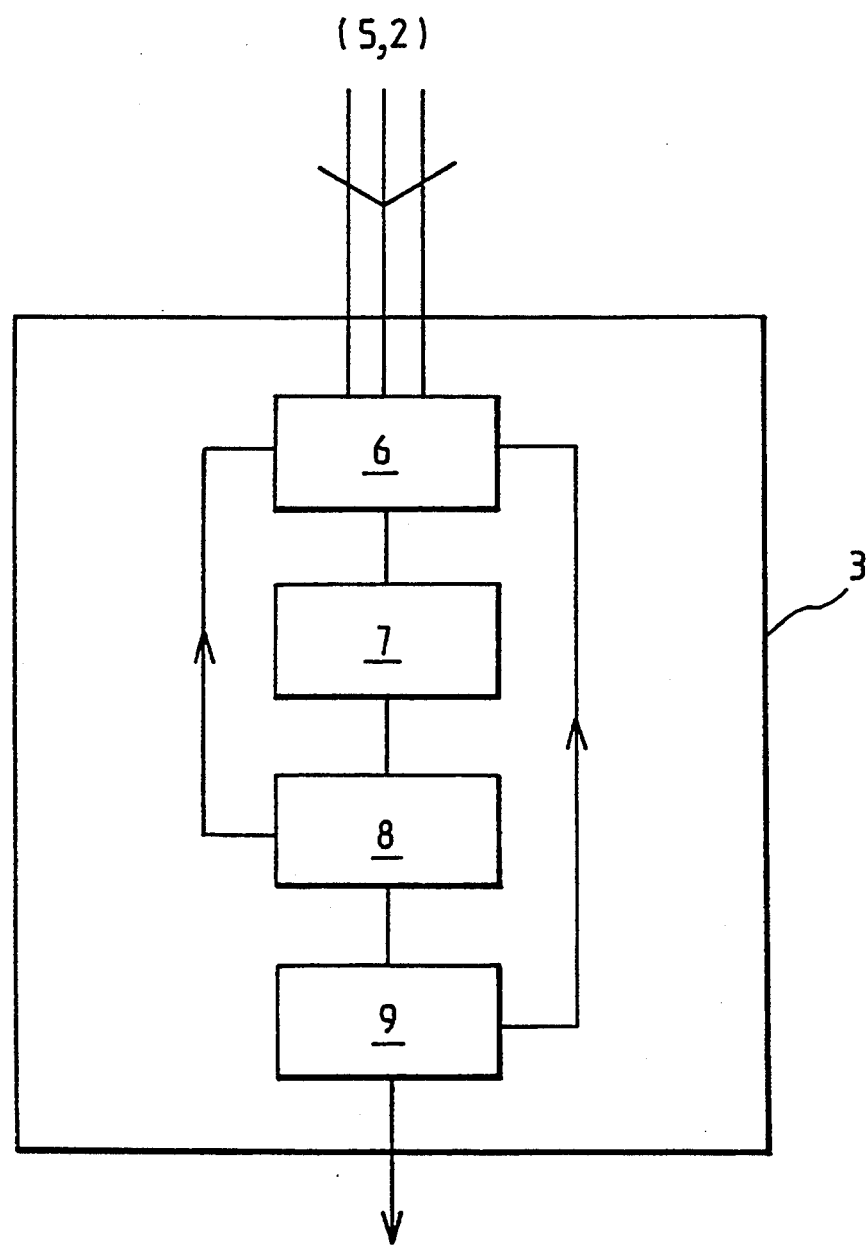
FIG. 3 is a synoptic diagram of the process.

FIG. 3 is a synoptic schema of the processing process of signals as it is performed by the computing central unit, starting from at least the six "S" signal coming at least from the six sensors 2 making the three pairs 5 previously defined.

Starting from the initial conditions at instant t0, or from the final conditions of the period of the previous time interval T, a first step consists in evaluating the location M of mobile 1, and its speed at the following estimated instant te, such as:

$$\vec{M_0M} = (te - t0)\vec{V_0}$$

$$\vec{V} = \vec{V_0}$$

The delays, the Doppler corrections and the various reception times such as $t_{1,2}$, $DD_{1,2}$, etc. are estimated during a second step 7.

The delays themselves and the Doppler are determined optimally in a third step 8, in order to offset the signals of a value as close as possible to reality but the Doppler differential accurate value as previously defined, is unknown, only an estimation of its value is accessed to, which must be optimized to increase the signal-to-noise ratio.

To determine the differential Doppler/delay couple for which the intercorrelation presents a maximum, it is then necessary to study an ambiguous function as, for instance:

$$X_{S_1S_2(DD,\tau)} = \frac{1}{T} \int_{T/2}^{T/2} S_1'((1 + DD) \cdot t) x S_2'(t - \tau) x dt$$

In a last step 9, the estimated mobile location at instant te is computed, as well as its instantaneous speed V(t) and the emission instant corresponding to said location of mobile 1.

By compilation of the three results obtained by the signals coming from the three sensor pairs, it is possible to obtain the mobile new complete position and speed, allowing to complete its trajectory. Then it is possible to start the operation again from the signal collected after the next known time interval, starting from the data of the computed point at previous interval.

Before processing this signal, as previously indicated, the whitening operation can be performed which principle it to be free from the notion of power at the interaction level to keep only the signal information content by a function of coherence which allows suppress all the types of linear filtrations; similarly all the signals transmitted by the hydrophones 2 in the most significative range of the wave frequencies emitted by said objects 1 can be digitalized, when the type of mobiles which may be listened to is known, in order reduce the computing times and thus to simplify it.

We claim:

1. A method for determining a trajectory of a moving underwater object, comprising the steps of:

generating a first sensor signal and a second sensor signal from a first sensor and a second sensor of a first sensor pair, respectively, from a signal generated by the object wherein a sensor separation distance between the first and second sensors of the first sensor pair is less than a sensor pair separation distance between the first sensor pair and a second sensor pair;

outputting the first and second sensor signals to a central processor as first and second output sensor signals;

processing the first and second output sensor signals to generate at least one of position data, speed data and direction data for the object; and repeating the generating, outputting and processing steps after a predetermined interval;

wherein the processing step comprises the steps of:

selecting one of the first and second output sensor signals as a reference signal;

selecting at least one of a presumed position, a presumed speed and a presumed direction for the object;

correlating the first and second output sensor signals based on the selected one of the presumed position, speed and direction;

revising the selected ones of the presumed position, speed and position based on the correlation between the first and second output sensor signals; and repeating the correlating and revising steps until a maximum correlation between the first and second output sensor signals is obtained.

2. The method of claim 1, wherein the presumed position, speed and distance selected in a subsequent iteration of the generating, outputting and processing steps are selected based on the revised presumed position, speed and distance providing the maximum correlation in a previous iteration.

3. The method of claim 1, wherein at least three pairs of sensors are used.

4. The method of claim 3, wherein the second pair of sensors and a third pair of sensors are arranged at a predetermined angle to the first pair of sensors.

5. The method of claim 4, wherein the predetermined angle is between 30° and 60°.

6. The method of claim 1, wherein the first and second sensors of each pair of sensors are hydrophones.

7. The method of claim 1, wherein the sensor separation distance is in the range of 0 to 100 meters.

8. The method of claim 1, wherein the sensor pair separation distance corresponds to a depth of the sensor below sea level.

9. The method of claim 1, wherein the sensor pair separation distance is in the range of 0 to 500 meters.

10. The method of claim 1, wherein the revising step comprises the steps of correcting the presumed speed based on doppler effects.

11. The method of claim 1, wherein the revising step comprises the step of determining the revised presumed position based on an intersection of a range of presumed directions of each of at least three pairs of sensors.

12. The method of claim 1, wherein the revising step comprises the step of determining the revised presumed speed based on components of the presumed speed projected onto perpendiculars to the presumed direction for each pair of sensors.

13. The method of claim 1, wherein the outputting step comprises the steps of:
    selecting portions of the first and second sensors signals corresponding to a predetermined range of frequency of the object-generated signal;
    digitizing the selected portions of the first and second sensor signals; and
    outputting the digitized portions of the first and second sensor signals as the first and second output sensor signals.

14. The method of claim 1, wherein the outputting step comprises the step of applying a white noise to the first and second sensor signals.

15. A system for determining a trajectory of a moving underwater object, comprising
    at least three sensor pairs of first and second sensors, each sensor pair outputting a first sensor signal and a second sensor signal; and
    a processor;
    wherein the processor comprises:
    selection means for selecting at least one of a presumed position, a presumed speed and a presumed direction of the object;
    correlation means for correlating the first sensor signal to the second sensors signal for at least one of the pairs of sensors based on at least one of the presumed position, speed and direction; and
    revising means for revising the presumed position speed and direction based on a correlation of the correlating means until a maximum correlation is obtained;
    wherein the first sensor and the second sensor are separated by a sensor distance, each pair of sensors is separated from the other pairs of sensors by at least a sensor pair separation distance, and the sensor separation distance is less than the sensor pair separation distance.

16. The trajectory determining system of claim 15, wherein the sensor separation distance is in the range of 0 to 100 meters.

17. The trajectory determining system of claim 15, wherein the sensor pair separation distance is in the range of 0 to 500 meters.

18. The trajectory determining system of claim 15, wherein the sensor pair separation distance is determined based on a depth of the sensor pairs below sea level.

19. The trajectory determining system of claim 15, wherein a first one of the sensor pairs is aligned in a predetermined relationship to an initial presumed direction of the object.

20. The trajectory determining system of claim 15, wherein a first one of the sensor pairs is a aligned in a first direction, and each of a second one and a third one of the sensor pairs is aligned in at an angle to the first direction.

21. The trajectory determining system of claim 20, wherein the angle is in the range of 30° to 60°.

22. The trajectory determining system of claim 15, wherein the processor further comprises doppler means for determining a doppler factor from the first and second sensor signals and correcting one of the presumed speed and the revised presumed speed based on the determined doppler factor.

23. The trajectory determining system of claim 15, wherein each of the first and second sensors of each sensor pair comprises:
    selection means for selecting portions of the corresponding sensor signal corresponding to a predetermined frequency range of an object-generated signal;
    digitizing means for digitizing the selected portions; and
    output means for outputting the selected digitized signal portions as the corresponding sensor signal.

24. The trajectory determining system of claim 15, wherein each one of the first and second sensors of each sensor pair comprises a white noise means for homogenizing the corresponding sensor signal to decouple signal content from signal power throughout.

* * * * *